US007051201B2

(12) United States Patent
Cuomo et al.

(10) Patent No.: US 7,051,201 B2
(45) Date of Patent: May 23, 2006

(54) SECURING CACHED DATA IN ENTERPRISE ENVIRONMENTS

(75) Inventors: Gennaro A. Cuomo, Apex, NC (US); Brian Keith Martin, Cary, NC (US); Anthony Joseph Nadalin, Austin, TX (US); Nataraj Nagaratnam, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 809 days.

(21) Appl. No.: 10/099,739

(22) Filed: Mar. 15, 2002

(65) Prior Publication Data

US 2003/0177386 A1    Sep. 18, 2003

(51) Int. Cl.
*G06F 1/26* (2006.01)
(52) U.S. Cl. ............... 713/164; 713/165; 713/200; 713/201
(58) Field of Classification Search ............... 713/164, 713/165, 200, 201
See application file for complete search history.

(56) References Cited

U.S. PATENT DOCUMENTS

| | | | |
|---|---|---|---|
| 5,224,166 A | 6/1993 | Hartman, Jr. | 380/50 |
| 5,237,614 A * | 8/1993 | Weiss | 713/159 |
| 5,345,508 A | 9/1994 | Lynn et al. | 380/46 |
| 5,923,756 A | 7/1999 | Shambroom | 380/21 |
| 6,249,866 B1 | 6/2001 | Brundrett et al. | 713/165 |

FOREIGN PATENT DOCUMENTS

| WO | WO099/14889 | 3/1999 |
|---|---|---|
| WO | WO01/39086 | 5/2001 |

OTHER PUBLICATIONS

F. Sandakly, et al., *PerDiS: An Infrastructure for Cooperative Engineering in Virtual Enterprise*, Working Conference on Infrastructures for Virtual Enterprises (PRO-VE'99),pp. 319-332, (Oct. 27-28, 1999).
*Shared Cipher Spec Protocol*, Research Disclosure, International Business Machines Corp., (Apr. 2000).
*Cache Me If You Can, The Race to Expand Bandwidth Relies on an Old Concept*, Communications News, <http://www.

(Continued)

*Primary Examiner*—Thomas R. Peeso
(74) *Attorney, Agent, or Firm*—A. Bruce Clay; Christopher & Weisberg, P.A.

(57) ABSTRACT

A method for securing cached data in an enterprise environment. The method can include processing a request to locate data in a query cache. If the data can be located in the query cache, the data can be retrieved from the query cache. Additionally, at least one encrypted portion of the retrieved data can be decrypted. Finally, the decrypted portion and any remaining unencrypted portion of the retrieved data can be forwarded to a requesting client. By comparison, if the data cannot be located in the query cache, the data can be retrieved from a back-end data source over a computer communications network, and forwarded to the requesting client. Additionally, at least a portion of the retrieved data can be encrypted and both the encrypted portion and any remaining unencrypted portion can be stored in the query cache.

10 Claims, 3 Drawing Sheets

OTHER PUBLICATIONS ndarticles.com/cf_dls/m0CMN/3_38/72607067/print.jhtml<, (Mar. 2001).

*Network Application for Integration of Electronic Marketplace and Procurement Portal Participants, Research Disclosure*, International Business Machines Corp., (Apr. 2001).

*Java™ Cryptography Extension (JCE)*, Sun Microsystems, Inc. <http://java.sun.com/products/jce/>, (Feb. 24, 2002).

* cited by examiner

SECURING CACHED DATA IN ENTERPRISE ENVIRONMENTS

BACKGROUND OF THE INVENTION

1. Statement of the Technical Field

The present invention relates to the field of enterprise computing and more particularly to the securing of cached data in an enterprise application environment.

2. Description of the Related Art

As business organizations deploy important business applications over the Internet, challenges arise in the form of processing delays and network latencies. Specifically, the placement of application content in a centralized server can compel users' requests to traverse multiple congested networks in an attempt to effectively interact with the application. As a result, this centralized approach to deploying applications on the Internet can hinder the attainment of scalability, reliability and performance levels that are considered "mission-critical" in the deployment of a business application.

In consequence of the inherent deficiencies of the centralized approach, there has been a recent trend to move more application processing functions to the edge of the network. In lay terms, the "edge" of the network refers to that portion of a publicly accessible network which is disposed communicatively closer to the end-user. While the positioning of servers and other network devices at the edge of the network can bear direct relation to the geographical positioning of the end-users, in some cases, the positioning of servers at the edge of the network can bear closer relation to the available communications bandwidth and the performance of network components linking end-users to the servers.

E-Business applications can experience dramatic performance and scalability improvements by off-loading applications from a centralized portion of an Intranet to the edge of the publicly accessible network. Application off-loading can be achieved by distributing application data to the edge of the network. In consequence, the load experienced by the centralized data servers can be reduced as can associated network traffic. One common method of off-loading data to the edge of the network includes query caching.

Query caching involves the dynamic storage of query results based upon query rules which determine when the results of a query ought to be stored in a local data store at the edge of the network. The cached data can be used to satisfy subsequent queries without retrieving the requested data from the back-end data store. Of course, where the requested data cannot be satisfied by the cache, the back-end data store can satisfy the query.

Notably, where the back-end data store in the Intranet includes sensitive data, security measures can be easily undertaken, including for instance, data encryption. In this way, unauthorized viewers cannot access the secured data without having prior knowledge of a decryption key. Furthermore, as the back-end data store is located within the Intranet, access to the application data, itself, can be regulated with some ease. Yet, the same does not hold true for application data which has been removed outside of the Intranet into what has been commonly referred to as the "demilitarized zone".

Specifically, while application data can be secured at the application level in a back-end data store, once the application data has been cached at the edge of the network in the demilitarized zone, the cached data can become vulnerable to unauthorized viewers. In particular, conventional query caches provide no mechanism for securing cached data from unauthorized viewers. Moreover, as the query cache resides in the demilitarized zone, access to the cache cannot be easily regulated. Thus, a serious security concern can arise where an enterprise application is to be deployed using an edge processing architecture.

SUMMARY OF THE INVENTION

The present invention overcomes the limitations of conventional query caches and provides a novel and non-obvious method, system and apparatus for securing data stored in a query cache in the demilitarized zone of an enterprise environment. In particular, in accordance with the inventive arrangements, a query cache at the edge of the network (in the demilitarized zone) can be associated with an encryption engine both for encrypting data destined for storage in the query cache, and for decrypting data retrieved from the query cache. Notably, the encryption engine can be selectively configured with interchangeable encryption systems, ranging from an ultra-secure hardware security module (HSM), to a moderately secure software based solution.

A method for securing cached data in an enterprise environment can include processing a request to locate data in a query cache. If the data can be located in the query cache, the data can be retrieved from the query cache. Additionally, at least one encrypted portion of the retrieved data can be decrypted. Finally, the decrypted portion and any remaining unencrypted portion of the retrieved data can be forwarded to a requesting client. By comparison, if the data cannot be located in the query cache, the data can be retrieved from a back-end data source over a computer communications network, and forwarded to the requesting client.

At least a portion of the retrieved data can be encrypted and both the encrypted portion and any remaining unencrypted portion can be stored in the query cache. Furthermore, the processing step can include locating a key within the request, subjecting the key to a one-way hashing function; and, comparing the hashed key to individual one-way hashed keys in the query cache. As it will be apparent to one skilled in the art, the comparison can determine whether the data can be located in the query cache.

A secured query cache system can include a query cache disposed in an edge server; and, an encryption engine communicatively linked to the edge server. Notably, the encryption engine can have a configuration for encrypting entries to the query cache and for decrypting entries retrieved from the query cache. Also, the encryption engine can include a modular interface for accepting interchangeable encryption configurations, the configurations including one of a hardware security module, and a software encryption component. Finally, the encryption module can implement the Java™ Cryptography Extension specified by Sun Microsystems, Inc. of Palo Alto, Calif., United States.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is a query cache system configured to encrypt data stored within a corresponding query cache. Notably, the query cache system of the present invention includes an encryption framework which provides for the selective configuration of varying levels of security in the query cache system. Specifically, differing levels of encryption can be interchangeably applied to the storage and retrieval of cached data. For instance, a hardware security module (HSM) based encryption solution can be applied where the security of the cached data is of utmost concern. Alternatively, where cost as a factor outweighs the strength of security required, a software based cryptographic algorithm can be applied.

Figure 1:
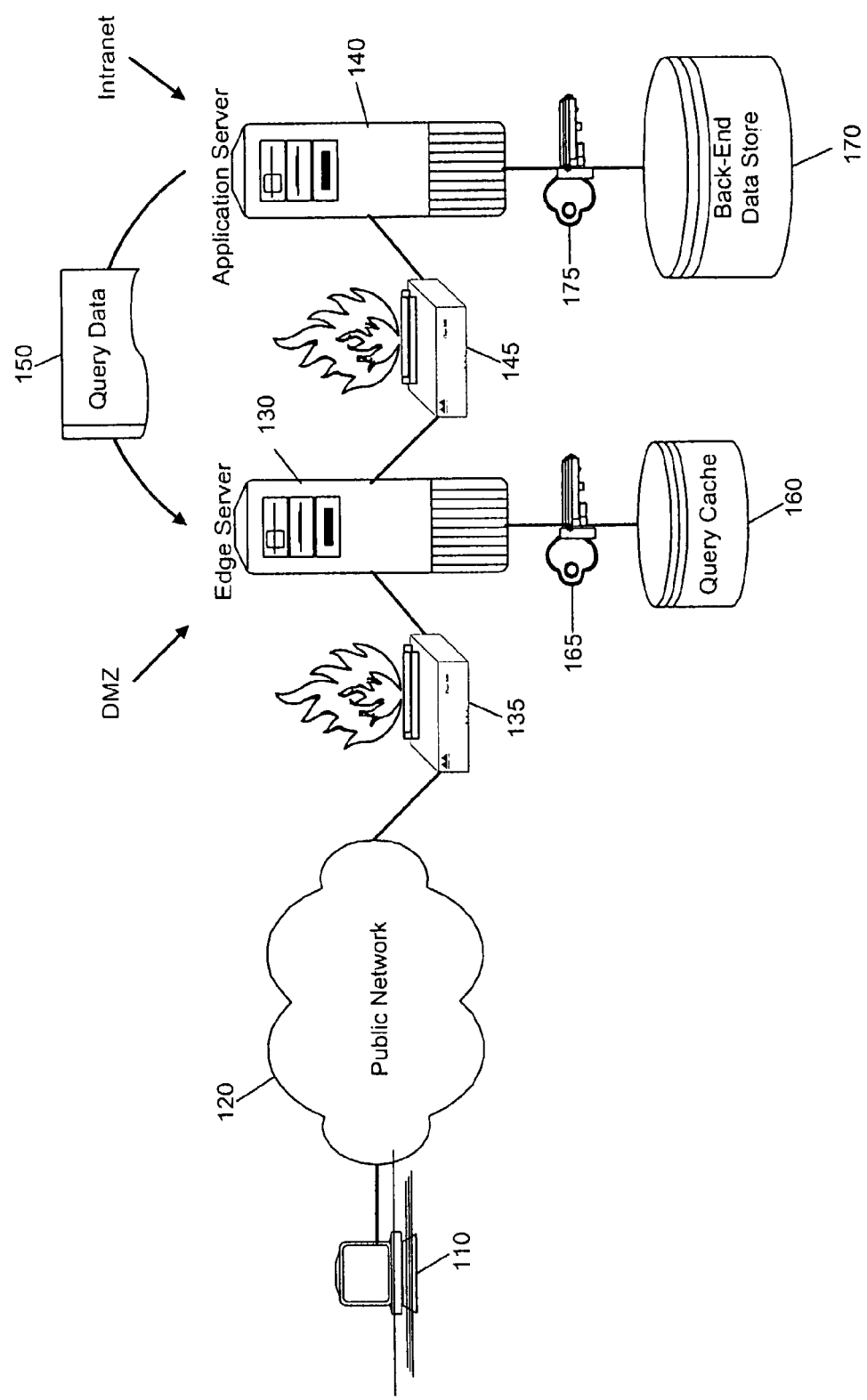
FIG. 1 is a schematic illustration of an enterprise architecture in which the query cache encryption system can be deployed in accordance with the inventive arrangements.

FIG. 1 is a schematic illustration of an enterprise architecture in which the secure query cache system of the present invention can be deployed. The secure query cache system can include both an application server 140 disposed within a secure Intranet, and an edge server 130 deployed at the edge of the public network 120 within a demilitarized zone. In particular, the application server 140 can have an associated back-end data store 170 in which application data can be stored for retrieval by clients 110 in the course of the operation of the query cache system.

Notably, though the application server 140 as illustrated in FIG. 1 remains alone in the Intranet, as will be appreciated by one skilled in the art, the invention as described herein should not be so limited. Rather, various implementations of the present invention can include within the Intranet not only an application server 140, but also a component transaction server (not shown) and a directory and security services server (not shown). Furthermore, the back-end data store 170, though illustrated as a single entity, can be comprised of multiple computing elements, the sum total of which form a database management system.

Each of the public network 120, edge server 130 and application server 140 can be securely separated from one another with firewalls 135, 145. Clients 110 can query the application server 140 over the public network 120 through the firewalls 135, 145. The edge server 130 can intercept the query and can first determine whether the edge server 130 can satisfy the query from data stored within a communicatively linked query cache 160. Only where the edge server 130 cannot satisfy the query with data in the query cache 160 must the edge server 130 forward the query to the application server 140.

In response to a query forwarded by the edge server 130 on in response to a query initiated by the client 110, the application server 140 can retrieve the requested query data 150 from the back-end data store 170. As shown in FIG. 1, the back-end data store 170 can include encrypted data which first, must be decrypted through encryption engine 175 before the query data 150 can be returned to the edge server 130. Still, the invention is not limited in regard to the data security configuration of the application server 140, and other aspects of the invention can include as simple a configuration as a mere server-side script processing queries with an unencrypted flat-file database. Conversely, in other aspects of the invention, the data security configuration of the application server 140 can include multiple levels of hardware and software based security where security is of paramount concern.

Importantly, where the application server 140 provides requested query data 150 to the edge server 130 in response to a client 110 originated query, the edge server 130 can process the query data 150 in encryption engine 165 before storing the encrypted data in the query cache 160. Concurrently, the edge server 130 can return the query data 150 the requesting client 110 over public network 120. Similarly, where the edge server 130 successfully determines that the edge server 130 can process a query without requesting assistance from the application server 140, the edge server 130 first can decrypt the cached query data in the encryption engine 165 before forwarding the decrypted query data to the requesting client 110 over the public network 120.

Figure 2:
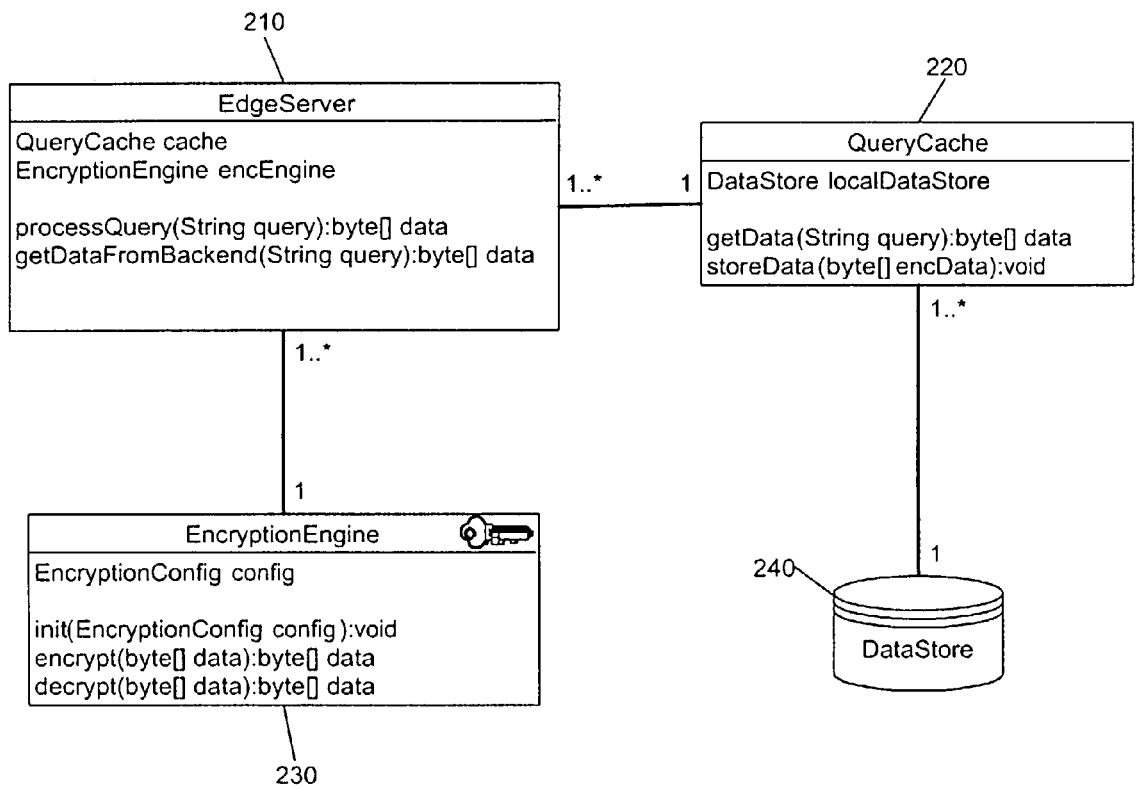
FIG. 2 is an object diagram of a query cache system for encrypting cached data in the query cache of FIG. 1; and, FIG. 3 is a flow chart illustrating a method for processing cached data in the query cache system of FIG. 2.

FIG. 2 is an object diagram of a query cache system for encrypting cached data in the query cache of FIG. 1. The query cache system can include an edge server object 210 in which client originating queries can be processed at the edge of the network. In particular, the query cache system can attempt to process received queries locally using the local data store 240 without having to retrieve application data from a back-end application server. The edge server object 210 can have associated therewith both a query cache object 220 and an encryption engine 230.

The encryption engine object 230 can be selectively configured at initialization time to apply one of several encryption methods, both hardware and software based, depending upon the security requirements of the particular application. For example, in one aspect of the invention, an HSM approach can be applied in which the encryption keys are stored not in soft storage, but in firmware as part of hardware circuitry communicatively linked to the edge server. By comparison, in another aspect of the invention, a pure software encryption scheme can be applied, for example the well-known Blowfish algorithm. In any case, the encryption engine itself can implement the Java™ Cryptography Extension (JCE) version 1.2.1 and its progeny which can handle not only HSM, but also DES, DESede, Blowfish, PBEWIthMD5AndDES, PBEWithM5AndTripleDES, Diffie-Hellman key agreement among multiple parties, HmacMD5 and MmacSHA1.

Once configured, the encryption engine object 230 can be used both to encrypt data in byte form, and to decrypt data, also in byte form. Still, the invention is not limited in regard to the precise data format able to be processed by the encrypt and decrypt method members of the encryption engine object 230. Rather, any other such data format can suffice inasmuch as the present invention relates not to the particular encryption and decryption methods applied but to the selective configuration of the encryption engine 230 in association with the operation of the edge server 210 and the corresponding storage and retrieval of application data from the data store through the query cache object 220.

Moreover, the invention is not limited to the encryption of every byte of data stored in the local data store 240. Rather, in other implementations of the present invention, portions of the cached data can be identified as more sensitive and correspondingly, such sensitive data can be encrypted. Other, less sensitive portions of the cached data can be left unencrypted. In this way, the encryption and decryption process can consume less computing resources than would otherwise be required where the entire portion of cached data must be encrypted prior to storage, and decrypted prior to retrieval.

The query cache object 220 can implement at least a getData method and a storeData method. The getData method can return requested data from the data store 240. Where the requested data cannot be located in the data store 240, a null-set can be returned. By comparison, the storeData method can store encrypted data in the data store 240. Importantly, the edge server 210 can coordinate the encryption and decryption of data in the data store 240 using the encryption engine object 230. Still, the invention is not limited to the precision arrangement of objects shown and other arrangements can suffice including those arrangements where one or more of the methods and data members of the edge server 210, query cache 220 and encryption engine 230 objects are combined in one or more other objects. Moreover, in other implementations, a procedural approach can be substituted in lieu of an object oriented approach.

Figure 3:
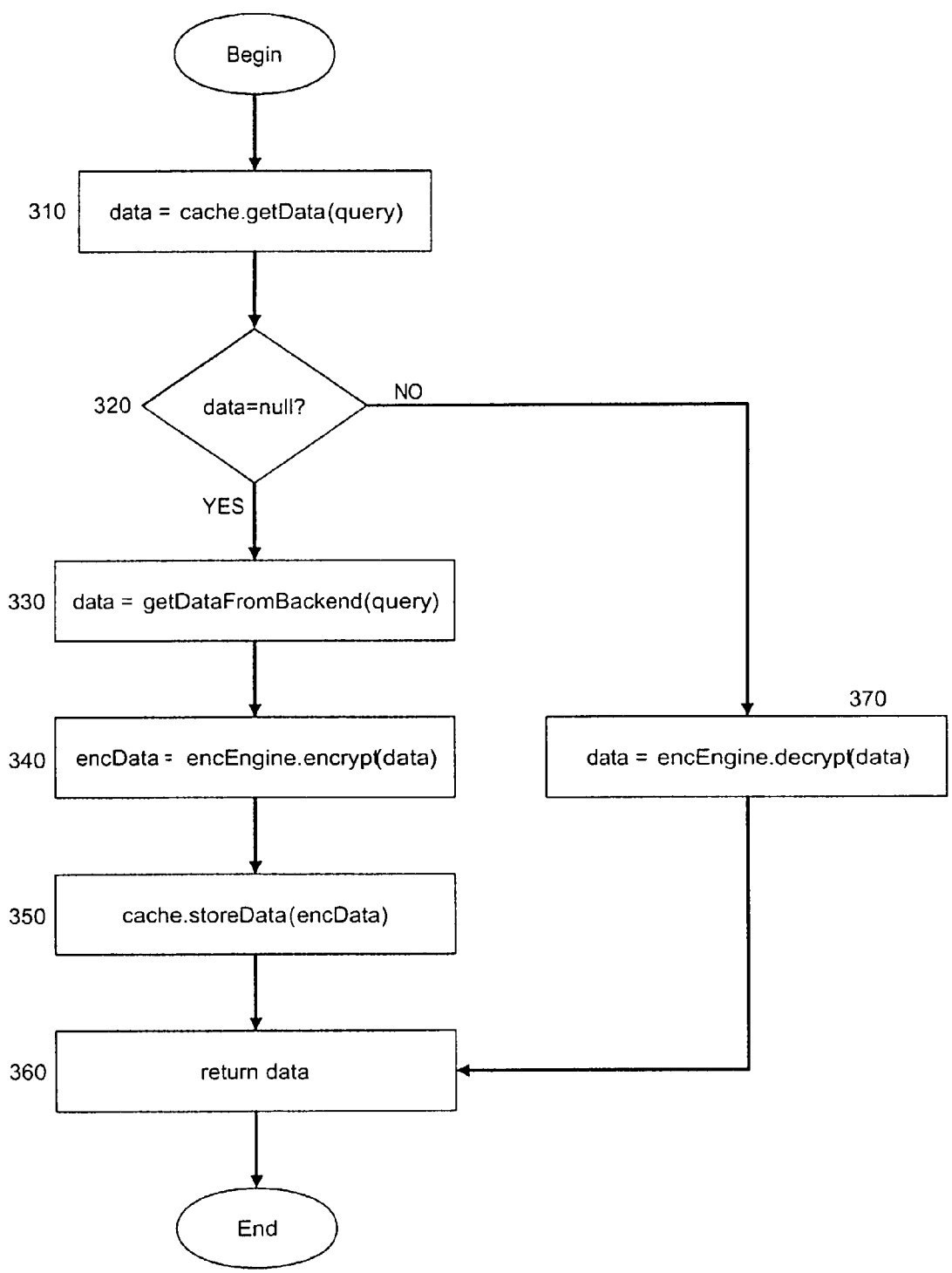

FIG. 3 is a flow chart illustrating a method for processing cached data in the query cache system of FIG. 2. Beginning in block 310, the getData method of the cache object can be invoked with a query request received from a client over a public network, for instance the Internet. In the getData method, the local query cache can be inspected to locate the requested data. The getData method can return either the requested data, or where the requested data cannot be located in the query cache, the null set. In decision block 320, if the getData method returns the null set, the process can continue in block 370. Otherwise, the process can continue in block 330.

Notably, within the query request, a key can be used to locate the requested data in the query cache as is well known in the art. Yet, in some circumstances, the key itself can contain sensitive information. For instance, a social security number can act as a key into a sensitive record of data in the local query cache. Thus, it can be important to encrypt the keys when stored in the local query cache. In one aspect of the present invention, the key can be subjected to a one-way hashing function in order to protect security of the key. Subsequently, the keys in the query requests can be subjected to the same one-way hashing function to determine whether the requested data resides in the local query cache.

In any event, in block 370, the located data can be passed to the encryption engine for decryption. Once the located data has been decrypted, in block 360 the decrypted data can be returned to the requesting client. By comparison, in block 330 where the data could not be located in the getData method, the query can be forwarded to the back-end application server. The back-end application server can return the requested data to the edge server and in block 340, the returned data can be passed to the encryption engine for encryption. Subsequently, in block 350 the encrypted data can be stored in the query cache. Finally, in block 360, the data returned by the back-end application server can be forwarded to the requesting client.

As will be apparent to one skilled in the art, by encrypting at least a portion of the cached data at the edge of the network, the insecurity of the cached data associated with prior art edge processing systems can be avoided. Moreover, inasmuch as the cryptography method applied to the cached data in the edge server can be selectively configured, differing levels of security can be applied depending upon the sensitivity of the data cached in the edge server. In particular, where security is of an utmost concern, an HSM method can be applied where the encryption key is not stored in memory.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method for securing cached data in an enterprise environment, said method comprising the steps of:
   processing a request to locate data in a query cache;
   if said data can be located in said query cache, retrieving said data from said query cache, decrypting at least one encrypted portion of said retrieved data, and forwarding said decrypted portion and any remaining unencrypted portion of said retrieved data to a requesting client; and,
   if said data cannot be located in said query cache, retrieving said data from a back-end data source over a computer communications network, forwarding said retrieved data to said requesting client, encrypting at least a portion of said retrieved data and storing in said query cache said encrypted portion and any remaining unencrypted portion.

2. The method of claim 1, wherein said encrypting and decrypting steps utilize an encryption key stored in a hardware security module (HSM).

3. The method of claim 1, wherein said processing step comprises:
   locating within said request a key;
   subjecting said key to a one-way hashing function; and,
   comparing said hashed key to individual one-way hashed keys in said query cache, said comparison determining whether said data can be located in said query cache.

4. A method for securing cached data in an edge-deployed query cache, said method comprising the steps of:
   configuring an encryption engine with an encryption system selected from the group consisting of a hardware security module (HSM), a software encryption module, or a combined hardware and software encryption system;
   associating the edge-deployed query cache with said encryption engine; and,
   configuring the edge-deployed query cache both to encrypt entries for storage in the edge-deployed query cache using said configured encryption engine the edge-deployed query cache retrieving said entries for storage from a back-end data source prior to said encryption, and also to decrypt entries retrieved from the edge-deployed query cache using said configured encryption engine.

5. The secured query cache system of claim 4, wherein said encryption engine comprises:

a modular interface for accepting interchangeable encryption configurations, said configurations comprising one of a hardware security module, and a software encryption component.

6. The system of claim 5, wherein said encryption module implements the JAVA(™) Cryptography Extension.

7. A secured query cache system comprising:

a query cache disposed in an edge server; and, an encryption engine communicatively linked to said edge server, said encryption engine having a configuration for encrypting entries to said query cache and decrypting entries retrieved from said query cache.

8. A machine readable storage having stored thereon a computer program for securing cached data in an enterprise environment, said computer program comprising a routine set of instructions for causing the machine to perform the steps of:

processing a request to locate data in a query cache;

if said data can be located in said query cache, retrieving said data from said query cache, decrypting at least one encrypted portion of said retrieved data, and forwarding said decrypted portion and any remaining unencrypted portion of said retrieved data to a requesting client; and, if said data cannot be located in said query cache, retrieving said data from a back-end data source over a computer communications network, forwarding said retrieved data to said requesting client, encrypting at least a portion of said retrieved data and storing in said query cache said encrypted portion and any remaining unencrypted portion.

9. The machine readable storage of claim 8, wherein said encrypting and decrypting steps utilize an encryption key stored in a hardware security module (HSM).

10. The machine readable storage of claim 8, wherein said processing step comprises:

locating within said request a key;

subjecting said key to a one-way hashing function; and, comparing said hashed key to individual one-way hashed keys in said query cache, said comparison determining whether said data can be located in said query cache.

* * * * *